United States Patent
Aga et al.

(10) Patent No.: US 6,894,106 B2
(45) Date of Patent: May 17, 2005

(54) AQUEOUS DISPERSION OF WATER- AND OIL-REPELLENT AND PROCESS FOR THE PRODUCTION THEREOF

(75) Inventors: Tsukasa Aga, Settsu (JP); Masaki Fukumori, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 44 days.

(21) Appl. No.: 10/380,569

(22) PCT Filed: Sep. 13, 2001

(86) PCT No.: PCT/JP01/07929
§ 371 (c)(1),
(2), (4) Date: Mar. 14, 2003

(87) PCT Pub. No.: WO02/24828
PCT Pub. Date: Mar. 28, 2002

(65) Prior Publication Data
US 2004/0014873 A1 Jan. 22, 2004

(30) Foreign Application Priority Data
Sep. 21, 2000 (JP) ........................ 2000-286964

(51) Int. Cl.$^7$ ............................................. C08L 27/12
(52) U.S. Cl. ...................... 524/544; 524/556; 524/547; 526/209
(58) Field of Search ................................ 524/544, 556, 524/547; 526/209

(56) References Cited

U.S. PATENT DOCUMENTS

| | | | |
|---|---|---|---|
| 3,062,765 A | 11/1962 | Sherman et al. | |
| 3,068,187 A | 12/1962 | Bolstad et al. | |
| 3,403,122 A | 9/1968 | Sherman et al. | |
| 4,831,092 A | * 5/1989 | Bock et al. | 526/209 |
| 5,240,990 A | 8/1993 | Kallfass et al. | |
| 5,531,913 A | * 7/1996 | Nair et al. | 430/56 |
| 5,965,656 A | 10/1999 | Yamamoto et al. | |
| 5,990,221 A | 11/1999 | Dames et al. | |
| 6,040,376 A | * 3/2000 | Mallon et al. | 524/547 |
| 6,130,287 A | * 10/2000 | Krishnan | 524/547 |

FOREIGN PATENT DOCUMENTS

| | | |
|---|---|---|
| EP | 0 572 269 A1 | 1/1993 |
| EP | 0 853 093 A1 | 7/1998 |
| EP | 0 902 073 A2 | 3/1999 |
| JP | 4-248863 A | 9/1992 |
| JP | 4-272986 A * | 9/1992 |
| JP | 5-17538 A | 1/1993 |
| JP | 6-33043 A | 2/1994 |
| JP | 6-49319 A | 2/1994 |
| JP | 6-033043 A * | 2/1994 |
| JP | 8-199111 A * | 8/1996 |
| JP | 10-60013 A | 3/1998 |
| JP | 10-204131 A | 8/1998 |
| JP | 10-204138 A | 8/1998 |
| JP | 11-80710 A | 3/1999 |
| JP | 11-255995 A | 9/1999 |
| JP | 0 852 239 A1 | 2/2000 |
| JP | 2000-44610 A | 2/2000 |
| JP | 2000-160149 A | 6/2000 |

* cited by examiner

Primary Examiner—David W. Wu
Assistant Examiner—Henry S Hu
(74) Attorney, Agent, or Firm—Sughrue Mion, PLLC

(57) ABSTRACT

Provided is an aqueous water- and oil-repellent dispersion free of an organic solvent and having durable water- and oil-repellency and excellent storage stability. The aqueous water- and oil-repellent dispersion is produced by emulsifying a perfluoroalkyl group-containing (meth)acrylate copolymer with the use of an ionic surfactant and/or a nonionic surfactant having less than 8 mol of added ethylene oxide per one hydrophobic group so that an average particle diameter is at most 100 nm and an integrating sphere turbidity is at most 20 (kaolin); adding, before the polymerization, a surfactant having at least 8 mol of added ethylene oxide per one hydrophobic group and a protective colloid; and conducting the polymerization.

9 Claims, No Drawings

AQUEOUS DISPERSION OF WATER- AND OIL-REPELLENT AND PROCESS FOR THE PRODUCTION THEREOF

FIELD OF THE INVENTION

The present invention relates to an aqueous water- and oil-repellent dispersion composition free of an organic solvent.

RELATED ARTS

A copolymer of a perfluoroalkyl group-containing (meth) acrylate is widely used as a water- and oil-repellent agent. In order to obtain the perfluoroalkyl group-containing (meth) acrylate copolymer, a polymerization method such as a bulk polymerization, a solution polymerization, a dispersion polymerization and an emulsion polymerization is used. Among them, the emulsion polymerization is industrially advantageous, because the perfluoroalkyl group-containing (meth)acrylate copolymer can be obtained directly in the form of an aqueous emulsion. However, it is known that the perfluoroalkyl group-containing (meth)acrylate is very insoluble in water and that the reaction does not easily proceed in the emulsion polymerization using water alone as a dispersing medium. Thus, proposed is a method of using a co-solvent (an organic solvent such as ketones and glycols) for the purpose of increasing the solubility of the monomer when conducting the emulsion polymerization (U.S. Pat. Nos. 3,062,765, 3,403,122 and 3,068,187). However, the use of a low flash point solvent such as acetone causes the problem of combustibility of products, and even if the organic solvent is a high flash point solvent, the use of the organic solvent problematically gives environmental pollution such as air pollution and waste water pollution during processing.

On the other hand, if a polymerizable compound is formed into a very fine emulsion, a monomer which cannot easily react in a usual emulsion polymerization can conduct the polymerization, which polymerization is known as "mini-emulsion polymerization". Various mini-emulsion polymerization methods of producing the aqueous water- and oil-repellent dispersion, which do not use the co-solvent, are proposed also for the polymerization of the perfluoroalkyl group-containing (meth)acrylate. For example, JP-A-4-248863 describes that the stable emulsion of the perfluoroalkyl group-containing (meth)acrylate can be obtained without the use of the organic solvent by using a fluorine-containing amine oxide or hydrocarbon-based amine oxide as the emulsifier, and then the emulsion is polymerized to give a copolymer emulsion comprising the perfluoroalkyl group-containing (meth)acrylate. In addition, JP-A-11-255995 describes a method of producing an aqueous emulsion characterized in that said monomer is emulsion-polymerized in the presence of a betaine-type emulsifier or an amine oxide-type emulsifier and a nonionic emulsifier at pH of 2 to 5.5. Further, JP-A-5-17538 and JP-A-6-49319 describe that the perfluoroalkyl group-containing (meth) acrylate can be stably emulsified by using a carboxyl group-containing polymerizable compound and a hydroxyl group-containing polymerizable compound so that the mini-emulsion polymerization can be conducted.

However, when the mini-polymerization polymerization is conducted according to these proposed methods, the emulsion after the polymerization has remarkably poor storage stability since the emulsion after emulsification has poor stability. For example, the polymer product produced according to the method of JP-A-11-255995 disadvantageously has remarkably poor storage stability so that said method cannot practically used. The reason why the storage stability after the polymerization is remarkably poor is that polymer particles is not fine, or that coarse particles are generated to decrease the stability of the emulsion. Since the particle diameter of the polymer is governed by the emulsified particle diameter of the polymerizable compound in the case of the mini-emulsion polymerization, it is necessary that the particles at the emulsification are sufficiently minified and coarse particles does not remains, in order to give good storage stability after polymerization. However, it was difficult for the conventionally proposed emulsifier to minify sufficiently the particles and to prevent the generation of coarse particles. When the emulsifier is used in excess to minify sufficiently the particles and to improve the stability, performances such as the durability of water- and oil-repellency and the dying fastness are remarkably deteriorated, resulting in practical problems.

Thus, in the conventional arts, the aqueous water- and oil-repellent dispersion exhibiting high water- and oil-repellency cannot have both the absence of a solvent and the excellent storage stability.

SUMMARY OF THE INVENTION

One of the objects of the present invention is to provide an aqueous water- and oil-repellent dispersion free of an organic solvent, having durable water- and oil-repellency and excellent storage stability.

The present invention provides an aqueous water- and oil-repellent dispersion composition comprising a polymer obtained by polymerizing an emulsion of a polymerizable compound wherein the polymerizable compound is emulsified into water so that an average particle diameter is at most 100 nm and an integrating sphere turbidity is at most 20 (kaolin), at least one polymerization dispersant selected from the group consisting of surfactants having at least 8 mol of added ethylene oxide per one mol of hydrophobic group and protective colloids is added to the emulsion of the polymerizable compound before the polymerization, and the emulsion of the polymerizable compound is free of an organic solvent.

Further, the present invention provides an aqueous water- and oil-repellent dispersion composition comprising:

(A) a homopolymer or copolymer comprising at least one polymerizable compound having a perfluoroalkyl or perfluoroalkenyl group and an acrylate or methacrylate group, or a copolymer comprising said polymerizable compound and another polymerizable compound copolymerizable therewith, (B) an emulsification dispersant comprising an ionic surfactant and/or a nonionic surfactant having less than 8 mol of added ethylene oxide per one mol of hydrophobic group, which emulsification dispersant is used for emulsifying the polymerizable compound, and (C) a polymerization dispersant comprising a nonionic surfactant having at least 8 mol of added ethylene oxide per one hydrophobic group and/or a protective colloid, which polymerization dispersant is added after the emulsion of the polymerizable compound is prepared and before the polymerization.

Additionally, the present invention provides a method or producing an aqueous water- and oil-repellent dispersion composition comprising:

emulsifying a polymerizable compound into water so that an average particle diameter is at most 100 nm and an integrating sphere turbidity is at most 20 (kaolin); adding, before the polymerization, at least one polymerization dispersant selected from the group consisting of surfactants having at least 8 mol of added ethylene oxide per one mol of hydrophobic group and protective colloids to prepare an emulsion of the polymerizable compound free of an organic solvent; and polymerizing the polymerizable compound to form a polymer.

DETAILED EXPLANATION OF THE INVENTION

In order to polymerize the aqueous water- and oil-repellent dispersion composition having excellent storage stability without using a co-solvent, the polymerizable compound is polymerized after the polymerizable compound is emulsified so that the emulsion has the average particle diameter of at most 100 nm and the integrating sphere turbidity of at most 20 (kaolin). If the average particle diameter is larger than 100 nm and/or the integrating sphere turbidity is larger than 20 (kaolin), the sedimentation amount of the product is large due to a large amount of coarse particles contained in the aqueous water- and oil-repellent dispersion composition after the polymerization. The integrating sphere turbidity may be at most 10.

A method of emulsifying the polymerizable compound to have the desired average particle diameter and integrating sphere turbidity includes a method of emulsifying the polymerizable compound by using, as a co-solvent, a low boiling point organic solvent such as acetone, and a method of emulsifying the polymerizable compound by using water alone as a dispersion medium substantially without the use of an organic solvent. When the co-solvent is used during the emulsification, the emulsion free of the organic solvent having the desired average particle diameter and integrating sphere turbidity can be obtained by eliminating the solvent before the polymerization. Even if the co-solvent is not used, the desired average particle diameter and integrating sphere turbidity can be obtained by suitable combination of the emulsifiers. In the emulsification, a small amount of the organic solvent remains in the emulsion after the elimination of the organic solvent and a small amount of the organic solvent contained in raw materials is incorporated into the emulsion. Because said organic solvent is in very small amount (e.g., at most 1.0% by weight, for example, at most 0.5% by weight, particularly at most 0.2% by weight, based on the aqueous water- and oil-repellent dispersion composition), problems such as combustibility are not caused and the significance of the present invention is not damaged. The presence of such small amount of the organic solvent does not affect the solubility of the polymerizable compound (particularly, a perfluoroalkyl group or perfluoroalkenyl group-containing (meth)acrylate), and does not impair the characteristics of the present invention that the polymerization is conducted without co-solvent.

The polymerizable compound is a polymerizable compound having a perfluoroalkyl or perfluoroalkenyl group and a acrylate or methacrylate group, and/or another polymerizable compound copolymerizable therewith, Examples of the polymerizable compound having the perfluoroalkyl or perfluoroalkenyl group and the acrylate or methacrylate group include fluorine-containing (meth)acrylates represented by the formulas:

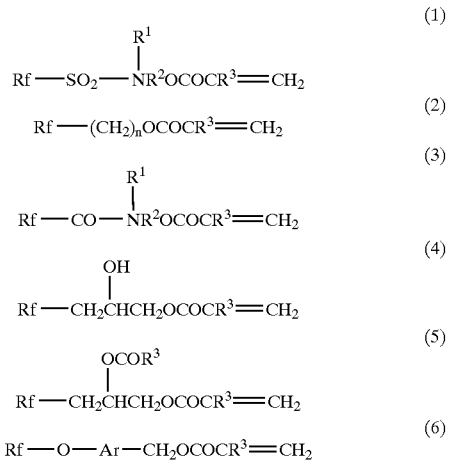

wherein Rf is a perfluoroalkyl or perfluoroalkenyl group having 3 to 21 carbon atoms,
$R^1$ is a hydrogen atom or an alkyl group having 1 to 10 carbon atoms,
$R^2$ is an alkylene group having 1 to 10 carbon atoms,
$R^3$ is a hydrogen atom or a methyl group,
Ar is an aryl group which optionally has a substituent group, and
n is an integer of 1 to 10.

Specific examples of said polymerizable compound include:
$CF_3(CF_2)_7(CH_2)OCOCH=CH_2$,
$CF_3(CF_2)_6(CH_2)OCOC(CH_3)=CH_2$,
$(CF_3)_2CF(CF_2)_6(CH_2)_2OCOCH=CH_2$,
$CF_3(CF_2)_7(CH_2)_2OCOC(CH_3)=CH_2$,
$CF_3(CF_2)_7(CH_2)_2OCOCH=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_6CH_2CH(OCOCH_3)CH_2OCOC(CH_3)=CH_2$,
$(CF_3)_2CF(CF_2)_6CH_2CH(OH)CH_2OCOCH=CH_2$,

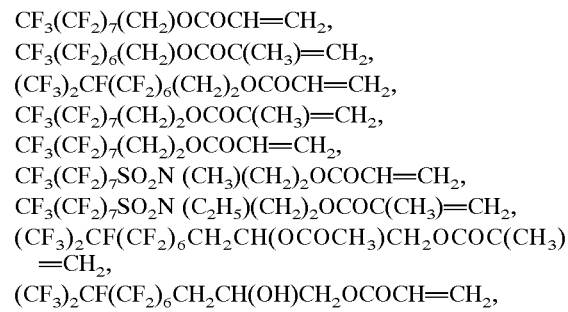

and

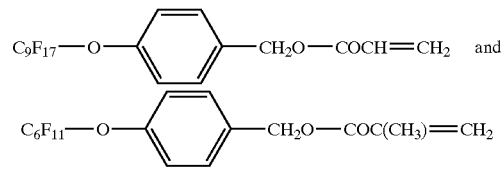

The another copolymerizable compounds are various. Examples of the another copolymerizable compound include: (1) acrylic acid and methacrylic acid, and methyl, ethyl, butyl, isobutyl, t-butyl, propyl, 2-ethylhexyl, hexyl, decyl, lauryl, stearyl, isobornyl, β-hydroxyethyl, glycidyl, phenyl, benzyl and 4-cyanophenyl esters thereof; (2) vinyl esters of fatty acids such as acetic acid, propionic acid, caprylic acid, lauric acid and stearic acid; (3) styrene compounds such as styrene, α-methylstyrene and p-methylstyrene; (4) vinyl halides and vinylidene compounds such as vinyl fluoride, vinyl chloride, vinyl bromide, vinylidene fluoride and vinylidene chloride; (5) fatty acid allyl esters such as allyl heptanoate, allyl caprylate and allyl caproate; (6) vinyl alkyl ketones such as vinyl methyl ketone and vinyl ethyl ketone; (7) acryl amides such as N-methylacrylamide and N-methylolmethacrylamide; and (8) dienes such as 2,3-dichloro-1,3-butadiene and isoprene.

The dispersant used when the polymerizable compound is emulsified in water is referred as an "emulsification dispersant". The emulsification dispersant is preferably a nonionic surfactant having less than 8 mol of addition ethylene oxide per one mol of a hydrophobic group, more preferably a combination (weight ratio: for example, 1:0.01 to 1:5) of a nonionic surfactant having less than 8 mol of addition ethylene oxide per one mol of a hydrophobic group and an ionic surfactant.

The ionic surfactant is a cationic surfactant alone or an anionic surfactant alone, or a combination of at least two thereof.

The cationic surfactant includes a quarternary ammonium salt, an ethylene oxide addition-type ammonium salt and an amine salt. Specific examples of the cationic surfactant include alkyl trimethyl ammonium chloride, dialkyl dimethyl ammonium chloride, alkyl methyl dipolyoxyethylene ammonium chloride, alkyl amine acetate salt and alkyldimethylamine hydrochloride salt.

The anionic surfactant includes a fatty acid salt, an alpha-olefin sulfonate salt, an alkylbenzene sulfonic acid and salt thereof, an alkyl sulfate ester salt, an alkylether sulfate ester salt, an alkylphenylether sulfate ester salt, a methyl taurinate salt, a sulfosuccinate salt and an ether sulfonate salt.

The amount of the emulsification dispersant may be from 0.1 to 20 parts by weight, preferably from 1 to 10 parts by weight, based on 100 parts by weight of the polymerizable compound.

The emulsification dispersant may be the nonionic surfactant having less than 8 mol of addition ethylene oxide per one mol of the hydrophobic group. Examples of such emulsification dispersant include polyoxyethylenealkyl ether, polyoxyethylenealkylphenyl ether, polyoxyethylene fatty acid ester, sorbitan fatty acid ester and polyoxyethylene sorbitan fatty acid ester.

The dispersant added to the emulsion of the polymerizable compound before polymerization is referred as a "polymerization dispersant".

The stable aqueous water- and oil-repellent dispersion composition can be obtained by polymerizing the emulsion having the desired average particle diameter and integrating sphere turbidity. Preferably, more stable aqueous water- and oil-repellent dispersion composition can be obtained by adding the polymerization dispersant (that is, the surfactant having at least 8 mol of the addition ethylene oxide per 1 mol of the hydrophobic group and/or protective colloid), which prevents the emulsion destruction, before the polymerization, followed by the polymerization.

The surfactant having at least 8 mole of the addition ethylene oxide per 1 mol of the hydrophobic group, is not limited, and may be a nonionic or may have an ionic group (an anionic group and/or a cationic group). Examples of the nonionic surfactant include polyoxyethylenealkyl ether, polyoxyethylenealkylphenyl ether, polyoxyethylene fatty acid ester and polyoxyethylene sorbitan fatty acid ester. Examples of the surfactant having the anionic group include an alkylether sulfate ester salt, an alkylphenylether sulfate ester salt and an ether sulfonate salt. Examples of the surfactant having the cationic group include an ethylene oxide addition-type ammonium salt, an ethylene oxide addition-type alkylamine and an ethylene oxide addition-type alkylamide.

The protective colloid includes water-soluble polymeric compounds such as polyvinyl alcohol, polyacrylate salts, water-soluble starch and water-soluble cellulose derivatives.

The amount of the polymerizable dispersant may be from 0.1 to 20 parts by weight, preferably from 1 to 10 parts by weight, based on 100 parts by weight of the polymerizable compound.

A chain transfer agent such as mercaptan can be also homogeneously dispersed into the emulsion by dissolving into the polymerization dispersant.

The emulsification dispersant and the polymerization dispersant may contain one hydrophobic group, or may contain at least two hydrophobic groups.

In the emulsification dispersant or the polymerization dispersant, the value obtained by dividing the number of mol of addition ethylene oxide contained in one molecule by the number of the hydrophobic group contained in one molecule is less than 8 (emulsification dispersant) or at least 8 (polymerization dispersant). For example, when using, as the emulsification dispersant, the nonionic surfactant having a plurality of hydrophobic groups in molecule, such as polyoxyethylene hardened castor oil, polyoxyethylene castor oil and polyoxyethylene sorbitol fatty acid ester, the value obtained by dividing the number of mol of ethylene oxide by the number of hydrophobic groups is necessarily less than 8.

Specifically, the present inventors succeeded in that a fine and extremely stable emulsion can be produced even in the absence of a solvent and an aqueous water- and oil-repellent dispersion excellent in storage stability after the polymerization can be produced by using an optimal surfactant only for the purpose of obtaining a fine and stable emulsion in the emulsification and by adding an optimal surfactant or protective colloid only for the purpose of obtaining a stable polymer liquid in the polymerization.

Among the polymerizable compounds which can copolymerize, it is difficult to emulsify a polymerizable compound having high volatility together with other polymerizable compounds. The presence of a large amount of a polymerizable compound having high water solubility might change HLB of the emulsifier to prevent the emulsification. These polymerizable compounds can be copolymerized with the perfluoroalkyl or perfluoroalkenyl group-containing (meth)acrylate by emulsifying the other polymerizable compounds to give desirable average particle diameter and integrating sphere turbidity and then adding these polymerizable compounds before the polymerization.

The production method of the present invention is very useful also in view of practicality.

A substrate which is treated with the dispersion of the present invention is not limited. Examples of the substrate include textile, glass, paper, wood, leather, brick, cement, metal and oxide thereof, ceramics and plastics. Particularly, the textile in the form of a fiber, a yarn or fabric is preferable.

The dispersion according to the present invention can be applied to the substrate preferably by coating, dipping, spraying, padding, roll coating, or combination of these procedures. The substrate is padded in the bath, and then excess liquid is usually removed by a squeezing roll to give the dry pickup amount (the weight of dry polymer on the substrate) of from 0.01 to 10% by weight based on the weight of the substrate. Then, the treated substrate is preferably heated at 100–200° C.

PREFERRED EMBODIMENTS OF THE INVENTION

Examples are shown hereinafter to illustrate the present invention in detail.

Properties are determined as follows:
Emulsification Property

The emulsification property is evaluated by an average particle diameter and an integrating sphere turbidity. The average particle diameter is measured by a dynamic light scattering method using a laser particle diameter analysis system LPA-3000. The integrating sphere turbidity is measured according to an integrating sphere-type photoelectric light intensity method in JIS K-0101 using a POIC integrating sphere turbidimeter SEP-PT-706D.

Good: Average particle diameter of at most 100 nm and integrating sphere turbidity of at most 20 (kaolin)
Fair: Either of average particle diameter of at most 100 nm or integrating sphere turbidity of at most 20 (kaolin)
Poor: Average particle diameter of at least 101 nm and integrating sphere turbidity of at least 21 (kaolin)

Coagulate Amount

The aqueous water- and oil-repellent dispersion composition is filtered with a 400 mesh stainless steel sieve, and a ratio of the weight of a dried matter remaining on the sieve to the weight of the whole composition is determined.

Good: Weight ratio of dried remaining matter is at most 100 ppm based on aqueous water- and oil-repellent dispersion composition
Fair: Weight ratio of dried remaining matter is at least 101 ppm and at most 500 ppm based on aqueous water- and oil-repellent dispersion composition
Poor: Weight ratio of dried remaining matter is at least 501 ppm based on aqueous water- and oil-repellent dispersion composition.

Water- and Oil-Repellency

The polymer dispersion liquid is diluted with water to give a treatment liquid having a solid content of 0.08% by weight. A polyester fabric is immersed in the treatment liquid, squeezed with a mangle to give a wet pickup of 65%, dried at 100° C. for two minutes, heated at 160° C. for one minute, and then subjected to an evaluation of water- and oil-repellency.

The water-repellency is expressed by the water repellency No. (cf. the following Table 1) determined by the spray method according to JIS (Japanese Industrial Standard) L-1092.

The oil-repellency is determined by dropping several drops of a test solution shown in the following Table 2 according to AATCC-TM118 on two positions of a surface of a test cloth and observing the penetration state of the drops after 30 seconds. The maximum point at which the test solution exhibits no penetration is expressed by the oil-repellency.

TABLE 1

| Water repellency No. | State |
|---|---|
| 5 | No wet on the surface |
| 4 | Slight wet on the surface |
| 3 | Partial wet on the surface |
| 2 | Wet on the surface |
| 1 | Wet over the whole surface |

TABLE 2

| Oil-repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol mixture solution (35/65 by weight) | 29.6 |
| 1 | Nujol | 31.2 |
| 0 | Inferior to 1 | — |

Mechanical Stability

The aqueous dispersion is diluted with tap water to give a solid content of 0.2% by weight. The diluted dispersion is stirred in a homomixer at 3,000 rpm for 10 minutes and generated scum is filtered with a black cotton fabric.
Good: No scum generated
Fair: Slight scum generated
Poor: Much scum generated Chemical Stability The aqueous dispersion is diluted with tap water to give a solid content of 0.6% by weight. 0.03% by weight of a fixing agent for nylon is added to the diluted dispersion and intimately stirred. The generation of agglomeration is observed.
Good: No agglomeration generated
Fair: Slight agglomeration generated
Poor: Much agglomeration generated Storage Stability After the aqueous dispersion (solid content: 30% by weight) is stored at 40° C. for one month, the generation of precipitation is observed.
Good: No precipitation
Fair: Slight precipitation
Poor: Much precipitation

EXAMPLE 1

100 g of $C_nF_{2n+1}CH_2CH_2OCOCH=CH_2$ (n is 6, 8, 10, 12 and 14 (average of n is 8)), 7 g of stearyl acrylate, 3 g of N-methylol acrylamide, 400 g of pure water, 0.6 g of acetic acid and 6 g of $C_{12}H_{25}O(C_2H_4O)_4H$ were charged into a 1 L autoclave and emulsified at 80° C. for 20 minutes by means of ultrasonic wave with stirring. After the emulsification, 1 g of n-dodecylmercaptan previously dispersed in 7 g of $C_{12}H_{25}O(C_2H_4O)_{21}H$ was added. Then, 30 g of vinyl chloride was pressed into the autoclave. 0.8 g of azobisisobutylamidine dihydrochloride was added and the reaction was conducted for 5 hours to give an aqueous water- and oil-repellent dispersion. The emulsification property, the coagulate amount, the water- and oil-repellency, the mechanical stability, the chemical stability and the storage stability of the aqueous water- and oil-repellent dispersion were evaluated. The results are shown in Table B.

EXAMPLES 2 TO 11

The same procedure as in Example 1 was repeated except that the type of the surfactant for emulsification, or the type of the surfactant or protective colloid added prior to polymerization was changed and the amounts of the emulsification dispersant and the polymerization dispersant were the same as shown in Table A. The results are shown in Table B.

COMPARATIVE EXAMPLES 1 to 7

The same procedure as in Example 1 was repeated except that the type of the surfactant for emulsification, or the type of the surfactant or protective colloid added prior to polymerization was changed and the amounts of the emulsification dispersant and the polymerization dispersant were the same as shown in Table A. The results are shown in Table B.

TABLE A

| | Surfactant for emulsification | Surfactant or protective colloid added prior to polymerization |
|---|---|---|
| Ex. 1 | $C_{12}H_{25}O(C_2H_4O)_4H$ | $C_{12}H_{25}O(C_2H_4O)_{21}H$ |
| Ex. 2 | $C_{12}H_{25}O(C_2H_4O)_6H$ | EO 15 mol addition coconut alkylammonium chloride |
| Ex. 3 | DSDMACl/ STMACl | $C_{12}H_{25}O(C_2H_4O)_{25}H$ |
| Ex. 4 | SDOSS | $C_{12}H_{25}O(C_2H_4O)_{25}H$ |
| Ex. 5 | SLS | $C_{12}H_{25}O(C_2H_4O)_2H$ $C_nH_{2n+1}O(C_3H_6O)_6(C_2H_4O)_{20}H$ |

TABLE A-continued

| | Surfactant for emulsification | Surfactant or protective colloid added prior to polymerization |
|---|---|---|
| Ex. 6 | DSDMACl | $C_{12}H_{25}O(C_2H_4O)_7H$ | Polyvinyl alcohol |
| Ex. 7 | DSDMACl | sec - $C_nH_{2n+1}O(C_2H_4O)_3H$ | $C_{12}H_{25}O(C_2H_4O)_{21}H$ |
| Ex. 8 | DSDMACl | sec - $C_nH_{2n+1}O(C_2H_4O)_5H$ | EO 15 mol addition coconut alkylammonium chloride |
| Ex. 9 | DSDMACl/ STMACl | $C_nH_{2n+1}O(C_2H_4O)_6H$ | Sorbitan monopalmitate EO 20 mol |
| Ex. 10 | DSDMACl/ STMACl | $C_nH_{2n+1}O(C_2H_4O)_3H$ | $C_nH_{2n+1}O(C_2H_4O)_{20}H$ |
| Ex. 11 | DSDMACl/ STMACl | Sorbitan monocaprylate | $C_nH_{2n+1}O(C_3H_6O)_6(C_2H_4O)_{20}H$ |
| Com. Ex. 1 | DSDMACl/ STMACl | $C_nH_{2n+1}O(C_2H_4O)_{10}H$ | $C_nH_{2n+1}O(C_2H_4O)_{20}H$ |
| Com. Ex. 2 | DSDMACl | $C_nH_{2n+1}O(C_2H_4O)_{20}H$ | None |
| Com. Ex. 3 | DSDMACl/ STMACl | Methyl cellulose | None |
| Com. Ex. 4 | DSDMACl | $C_{12}H_{25}O(C_2H_4O)_2H$ | None |
| Com. Ex. 5 | DSDMACl/ STMACl | $C_nH_{2n+1}O(C_2H_4O)_3H$ | None |
| Com. Ex. 6 | SLS | sec - $C_nH_{2n+1}O(C_2H_4O)_3H$ | None |
| Com. Ex. 7 | DSDMACl | $C_{12}H_{25}O(C_2H_4O)_4H$ | sec - $C_nH_{2n+1}O(C_2H_4O)_5H$ |

Note:
DSDMACl: Distearyldimethylammonium chloride
STMACl: Stearyltrimethylammonium chloride
SDOSS: Sodium dioctylsulfosuccinate
SLS: Sodium laurylsulfonate

TABLE B

| | | | Water- and oil-repellency | | | | | | | |
|---|---|---|---|---|---|---|---|---|---|---|
| | | | Initial | | | | | | | |
| | | | HL-0 | | HL-3 | | DC-3 | | | | |
| | Emulsification property | Coag. amount | Water repellency | Oil repellency | Water repellency | Oil repellency | Water repellency | Oil repellency | Mechanical stability | Chemical stability | Storage stability |
| Ex. 1 | Good | Good | 5 | 7 | 4 | 5 | 4 | 3 | Good | Good | Good |
| Ex. 2 | Good | Good | 5 | 7 | 5 | 5 | 4 | 4 | Good | Good | Good |
| Ex. 3 | Good | Good | 5 | 6 | 5 | 4 | 4 | 4 | Good | Good | Good |
| Ex. 4 | Good | Good | 4 | 5 | 3 | 4 | 3 | 3 | Good | Good | Good |
| Ex. 5 | Good | Good | 4 | 5 | 3 | 4 | 3 | 3 | Good | Good | Good |
| Ex. 6 | Good | Good | 5 | 6 | 5 | 5 | 4 | 4 | Good | Good | Good |
| Ex. 7 | Good | Good | 5 | 7 | 5 | 5 | 4 | 3 | Good | Good | Good |
| Ex. 8 | Good | Good | 5 | 7 | 4 | 6 | 4 | 4 | Good | Good | Good |
| Ex. 9 | Good | Good | 5 | 7 | 4 | 6 | 4 | 5 | Good | Good | Good |
| Ex. 10 | Good | Good | 5 | 7 | 5 | 6 | 5 | 4 | Good | Good | Good |
| Ex. 11 | Good | Good | 5 | 6 | 4 | 5 | 4 | 4 | Good | Good | Good |
| Com. Ex. 1 | Fair | Good | 4 | 5 | 3 | 2 | 3 | 2 | Good | Good | Fair |
| Com. Ex. 2 | Poor | Fair | 4 | 5 | 3 | 2 | 3 | 2 | Fair | Fair | Fair |
| Com. Ex. 3 | Poor | Fair | 4 | 6 | 2 | 2 | 2 | 1 | Poor | Fair | Fair |
| Com. Ex. 4 | Good | Poor | 5 | 6 | 3 | 3 | 3 | 3 | Poor | Poor | Poor |
| Com. Ex. 5 | Good | Poor | 5 | 7 | 4 | 4 | 4 | 3 | Poor | Poor | Poor |
| Com. Ex. 6 | Good | Poor | 4 | 5 | 2 | 2 | 2 | 1 | Poor | Good | Poor |
| Com. Ex. 7 | Good | Poor | 5 | 6 | 4 | 4 | 4 | 2 | Fair | Poor | Poor |

Effects of the Invention

According to the present invention, the aqueous water- and oil-repellent dispersion free of an organic solvent and having durable water- and oil-repellency and excellent storage stability can be obtained.

What is claimed is:

1. An aqueous water- and oil-repellent dispersion composition comprising a polymer obtained by polymerizing an emulsion of a polymerizable compound wherein the polymerizable compound is emulsified into water so that an average particle diameter is at most 100 nm and an integrating sphere turbidity is at most 20 (kaolin), at least one polymerization dispersant selected from the group consisting of (i) surfactants having at least 8 mol of added ethylene oxide per one mol of hydrophobic group, and (ii) protective colloids is added to the emulsion of the polymerizable compound before the polymerization, the emulsion of the polymerizable compound is free of an organic solvent, and the polymerizable compound comprises a polymerizable monomer having a perfluoroalkyl or perfluoroalkenyl group and an acrylate or methacrylate group.

2. The aqueous water- and oil-repellent dispersion composition according to claim 1, wherein a water-soluble or volatile polymerizable compound is added after the emulsification and before the polymerization.

3. The aqueous water- and oil-repellent dispersion composition according to claim 1, wherein an emulsification dispersant is used for the purpose of emulsifying the polymerizable compound so that an average particle diameter is at most 100 nm and an integrating sphere turbidity is at most 20 (kaolin), and said emulsification dispersant is an ionic surfactant and/or a nonionic surfactant having less than 8 mol of added ethylene oxide per one mol of hydrophobic group.

4. The aqueous water- and oil-repellent dispersion composition according to claim 3, wherein a water-soluble or volatile polymerizable compound is added after the emulsification and before the polymerization.

5. A treated material which is obtained by treating a substrate with the composition according to claim 1.

6. An aqueous water- and oil-repellent dispersion composition comprising:

(A) a homopolymer or copolymer comprising at least one polymerizable compound having a perfluoroalkyl or perfluoroalkenyl group and an acrylate or methacrylate group, or a copolymer comprising said polymerizable compound and another polymerizable compound copolymerizable therewith, (B) an emulsification dispersant comprising an ionic surfactant and/or a nonionic surfactant having less than 8 mol of added ethylene oxide per one mol of hydrophobic group, which emulsification dispersant is used for emulsifying the polymerizable compound, and (C) a polymerization dispersant comprising a nonionic surfactant having at least 8 mol of added ethylene oxide per one mol of hydrophobic group and/or a protective colloid, which polymerization dispersant is added after the emulsion of the polymerizable compound is prepared and before the polymerization.

7. The aqueous water- and oil-repellent dispersion composition according to claim 6, wherein a water-soluble or volatile polymerizable compound is added after the emulsification and before the polymerization.

8. A treated material which is obtained by treating a substrate with the composition according to claim 6.

9. A method of producing an aqueous water- and oil-repellent dispersion composition comprising:

emulsifying a polymerizable compound into water so that an average particle diameter is at most 100 nm and an integrating sphere turbidity is at most 20 (kaolin);

adding, before the polymerization, at least one polymerization dispersant selected from the group consisting of (i) surfactants having at least 8 mol of added ethylene oxide per one mol of hydrophobic group, and (ii) protective colloids to prepare an emulsion of the polymerizable compound free of an organic solvent; and polymerizing the polymerizable compound to form a polymer, wherein the polymerizable compound comprises a polymerizable monomer having a perfluoroalkyl or perfluoroalkenyl group and an acrylate or methacrylate group.

* * * * *